United States Patent
Satou et al.

(10) Patent No.: US 9,032,816 B2
(45) Date of Patent: May 19, 2015

(54) ULTRASONIC TRANSDUCER AND ULTRASONIC FLOW-METER

(75) Inventors: Masato Satou, Nara (JP); Hideaki Morihana, Nara (JP); Akihisa Adachi, Nara (JP); Makoto Nakano, Kyoto (JP); Yukinori Ozaki, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 14/111,988

(22) PCT Filed: May 24, 2012

(86) PCT No.: PCT/JP2012/003384
§ 371 (c)(1),
(2), (4) Date: Oct. 15, 2013

(87) PCT Pub. No.: WO2012/164879
PCT Pub. Date: Dec. 6, 2012

(65) Prior Publication Data
US 2014/0033827 A1 Feb. 6, 2014

(30) Foreign Application Priority Data
Jun. 3, 2011 (JP) ................................. 2011-124824

(51) Int. Cl.
*G01F 1/66* (2006.01)
*G10K 11/00* (2006.01)

(52) U.S. Cl.
CPC ...... *G01F 1/66* (2013.01); *G01F 1/662* (2013.01); *G01F 1/667* (2013.01); *G10K 11/002* (2013.01)

(58) Field of Classification Search
CPC ........................................................ G01F 1/66
USPC ................... 73/861.27, 861.28; 347/70, 71
See application file for complete search history.

(56) References Cited

U.S. PATENT DOCUMENTS

| | | | |
|---|---|---|---|
| 5,121,628 A | 6/1992 | Merkl et al. | |
| 2010/0296692 A1 | 11/2010 | Reiche | |
| 2011/0284656 A1* | 11/2011 | Kambayashi et al. | 239/102.2 |

(Continued)

FOREIGN PATENT DOCUMENTS

| | | |
|---|---|---|
| DE | 198 32 072 A1 | 2/1999 |
| FR | 2 952 221 A1 | 5/2011 |

(Continued)

OTHER PUBLICATIONS

Extended European Search Report in corresponding European Application No. 12792522.0, dated Oct. 9, 2014, 7 pages.

(Continued)

*Primary Examiner* — Jewel V Thompson
(74) *Attorney, Agent, or Firm* — Brinks Gilson & Lione

(57) ABSTRACT

An ultrasonic wave transmitting and receiving unit includes: a piezoelectric member supporting plate; an acoustic matching member fixed to one surface of the piezoelectric member supporting plate; a piezoelectric member fixed to the other surface. Moreover, the ultrasonic wave transmitting and receiving unit includes: an insulating vibration suppressing member integrally formed in such a manner as to cover the piezoelectric member and the piezoelectric member supporting plate, wherein the insulating vibration suppressing member has a hole reaching the piezoelectric member supporting plate.

24 Claims, 7 Drawing Sheets

(56) References Cited

U.S. PATENT DOCUMENTS

2012/0266690 A1  10/2012  Ozaki et al.
2013/0307633 A1* 11/2013  Onishi et al. .................. 331/155

FOREIGN PATENT DOCUMENTS

| | | |
|---|---|---|
| JP | 08-214397 A | 8/1996 |
| JP | 10-224895 A | 8/1998 |
| JP | 11-52958 A | 2/1999 |
| JP | 2001-159551 A | 6/2001 |
| JP | 2003-302386 | 10/2003 |
| JP | 2004-349973 A | 12/2004 |
| JP | 2006-090751 A | 4/2006 |
| JP | 2007-201992 A | 8/2007 |
| WO | WO 2011/061929 A1 | 5/2011 |

OTHER PUBLICATIONS

International Search Report for International Application No. PCT/JP2012/003384, dated Aug. 21, 2012, 2 pages.

* cited by examiner

100

120

ULTRASONIC TRANSDUCER AND ULTRASONIC FLOW-METER

This application is a 371 application of PCT/JP2012/003384 having an international filing date of May 24, 2012, which claims priority to JP 2011-124824 filed Jun. 3, 2011, the entire contents of which are incorporated herein by reference.

TECHNICAL FIELD

The present invention relates to an ultrasonic wave transmitting and receiving unit for transmitting an ultrasonic wave into a fluid or receiving an ultrasonic wave from a fluid, and an ultrasonic flow rate measuring apparatus using the ultrasonic wave transmitting and receiving unit.

BACKGROUND ART

Explanation will be made on the configuration of a conventional ultrasonic wave transmitting and receiving unit for use in an ultrasonic flow rate measuring apparatus.

FIG. 11 is a cross-sectional view showing the configuration of a conventional ultrasonic wave transmitting and receiving unit.

In an embodiment shown in FIG. 11, ultrasonic wave transmitting and receiving unit 100 is provided with top 60, side wall 61, case 63, piezoelectric member 64, vibration suppressor 65, holder 66, and vibration transmission suppressor 67.

Case 63 is formed into a topped cylindrical shape, and has side wall 61 and supporter 62 extending outward from side wall 61. Piezoelectric member 64 is fixed at the inner wall surface of top 60. Vibration suppressor 65 is fitted around side wall 61 in close contact, thereby suppressing vibrations occurring on side wall 61.

Holder 66 holds supporter 62. Vibration transmission suppressor 67 includes holder 66 therein, and fixes case 63 to channel 68 in a vibration suppressing manner.

Vibration suppressor 65 and holder 66 of vibration transmission suppressor 67 are formed integrally with each other (see Patent Literature 1).

FIG. 12 is a cross-sectional view showing a conventional ultrasonic wave transmitting and receiving unit having another configuration.

In ultrasonic wave transmitting and receiving unit 120, acoustic matching layer 71 having a thickness of ¼ of a wavelength λ of an ultrasonic wave is fixed at either surface of piezoelectric element 70.

Cylindrical case 72 constituted so as to surround piezoelectric element 70 is secured to acoustic matching layer 71, thus constituting ultrasonic sensor 73. Acoustic matching layer 71 is constituted by dispersing a glass balloon in a synthetic resin. Cylindrical case 72 is made of a plastic material having an acoustic impedance greater than that of acoustic matching layer 71. Moreover, cylindrical case 72 is filled with elastic resin 74 in such a manner as to embed piezoelectric element 70 therein (see Patent Literature 2).

However, with the configuration of ultrasonic wave transmitting and receiving unit 100, a radiation surface of piezoelectric member 64 is inclined if holder 66 is inclined in the case of being attached to an ultrasonic flow rate measuring apparatus, so that the direction of a propagation path of an ultrasonic wave may be shifted. In this case, there arises a problem to be solved that a propagation time, that is, measurement accuracy is adversely affected.

In contrast, like ultrasonic wave transmitting and receiving unit 120, a filler can secure reliability and facilitate the identification of a position of an ultrasonic wave radiating surface in the case where elastic resin 74 is filled in such a manner as to embed piezoelectric element 70 therein. However, there remains a problem to be solved with respect to a method for fixing unit 120 such configured as described above to a channel with little reverberant propagation.

PTL 1: Unexamined Japanese Patent Publication No. 2001-159551

PTL 2: Unexamined Japanese Patent Publication No. H10-224895

SUMMARY OF THE INVENTION

The present invention has been accomplished to enable an ultrasonic wave radiating surface of an ultrasonic wave transmitting and receiving unit to be accurately set, so as to achieve an ultrasonic flow rate measuring apparatus capable of accurately measuring a flow rate.

An ultrasonic wave transmitting and receiving unit according to the present invention includes: a piezoelectric member supporting plate; an acoustic matching member fixed to one surface of the piezoelectric member supporting plate; a piezoelectric member fixed to the other surface; and an insulating vibration suppressing member integrally formed in such a manner as to cover the piezoelectric member and the piezoelectric member supporting plate, the insulating vibration suppressing member having a hole reaching the piezoelectric member supporting plate.

In this manner, the piezoelectric member supporting plate is pressed at the hole by the projection formed at the outside member so that the radiation surface of the ultrasonic wave transmitting and receiving unit can be accurately set.

Moreover, an ultrasonic wave transmitting and receiving unit according to the present invention includes: a topped cylindrical metal case having a top, a side wall, and a supporter extending outward from the side wall; a piezoelectric member contained at an inner surface of the top of the topped cylindrical metal case; an acoustic matching member disposed at an outer surface of the top; and an insulating vibration suppressing member integrally formed in such a manner as to cover the piezoelectric member and the topped cylindrical metal case, the insulating vibration suppressing member having a hole reaching the supporter.

As a consequence, the projection formed at the outside member presses the end of the topped cylindrical metal case at the hole, so that the ultrasonic wave transmitting and receiving unit can be fixed at a position apart from the piezoelectric member in the ultrasonic wave transmitting and receiving unit. Consequently, it is possible to more attenuate reverberant propagation from the piezoelectric member.

Additionally, an ultrasonic wave flow rate measuring apparatus according to the present invention includes: a flow rate measuring unit for measuring a flow rate of a fluid flowing on a channel; a pair of the ultrasonic wave transmitting and receiving units according to the present invention disposed in the flow rate measuring unit; a projection for holding the ultrasonic wave transmitting and receiving unit at the hole; a measuring unit for measuring an ultrasonic wave propagation time between the pair of ultrasonic wave transmitting and receiving units; and a calculating unit for obtaining the flow rate of the fluid in response to a signal output from the measuring unit.

Consequently, the position and inclination of the ultrasonic wave radiation surface of the ultrasonic wave transmitting and receiving unit can be accurately set, thus accurately measuring the flow rate.

As described above, with the ultrasonic wave transmitting and receiving unit and the ultrasonic wave flow rate measuring apparatus according to the present invention, the ultrasonic wave radiation surface can be accurately set, thus accurately measuring the flow rate.

DETAILED DESCRIPTION OF THE PREFERRED EMBODIMENTS

Exemplary embodiments according to the present invention will be described below with reference to the attached drawings. Here, the exemplary embodiments shall not limit the present invention.

First Exemplary Embodiment

Figure 1:
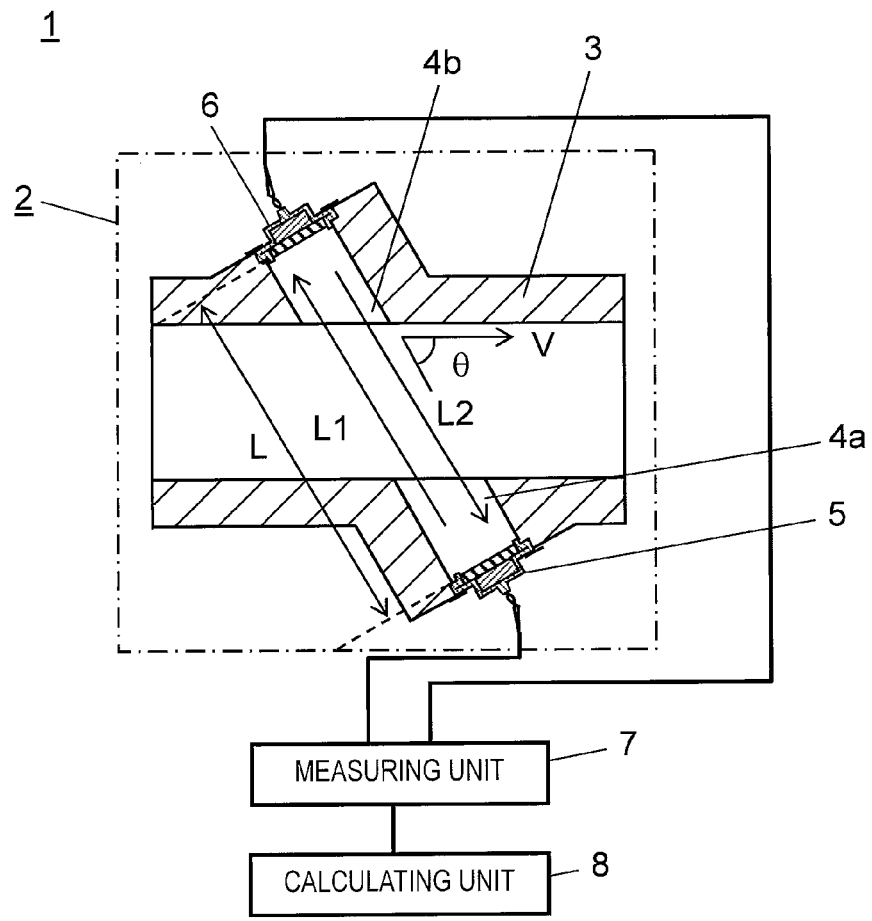
FIG. 1 is a cross-sectional view showing an ultrasonic flow rate measuring apparatus in a first exemplary embodiment according to the present invention.

FIG. 1 is a cross-sectional view showing ultrasonic flow rate measuring apparatus 1 in a first exemplary embodiment according to the present invention.

As shown in FIG. 1, flow rate measuring unit 2 in ultrasonic flow rate measuring apparatus 1 is provided with channel 3.

Openings 4a and 4b for propagating ultrasonic waves so as to transmit and receive them are formed in a slantwise direction with respect to channel 3. Ultrasonic wave transmitting and receiving units 5 and 6 are fixed to the ends of openings 4a and 4b, respectively, in such a manner as to face each other.

Referring to FIG. 1, reference character L1 designates a propagation channel for an ultrasonic wave that is propagated from ultrasonic wave transmitting and receiving unit 5 whereas reference character L2 designates a propagation channel for an ultrasonic wave that is propagated from ultrasonic wave transmitting and receiving unit 6.

Here, a flow rate of a fluid flowing in channel 3 is represented by V; a sonic speed in the fluid, by C; and an angle formed by a fluid flow direction and an ultrasonic wave propagation direction, by θ.

Then, propagation time t1 until the ultrasonic wave emitting from ultrasonic wave transmitting and receiving unit 6 reaches ultrasonic wave transmitting and receiving unit 5 when the former is used as a wave transmitting unit whereas the latter is used as a wave receiving unit is expressed by the following equation:

$$t1 = L/(C + V \cos \theta) \quad (1)$$

Next, propagation time t2 until the ultrasonic wave pulse emitting from ultrasonic wave transmitting and receiving unit 5 reaches ultrasonic wave transmitting and receiving unit 6 is expressed by the following equation:

$$t2 = L/(C - V \cos \theta) \quad (2)$$

When sonic speed C of the fluid is deleted from the equations (1) and (2), a relation expression below is obtained:

$$V = L/(2 \cos \theta ((1/t1) - (1/t2))) \quad (3)$$

Here, when distance L between ultrasonic wave transmitting and receiving units 5 and 6 and the above-described angle θ have been known already, flow rate V can be obtained by calculating unit 8 using the measurement values of propagation times t1 and t2 obtained by measuring unit 7. Flow rate V is multiplied by cross-sectional area S of channel 3 and correction coefficient K (Q=KSV), thereby obtaining flow rate Q. This calculation also is performed by calculating unit 8.

In the above-described measurement system, if the ultrasonic wave radiation surfaces of ultrasonic wave transmitting and receiving units 5 and 6 are not accurately fixed, the ultrasonic wave propagation channels are shifted from predetermined propagation channels L1 and L2. As a consequence, reflection or the like occurs inside of openings 4a and 4b, and therefore, the propagation time may not be accurately measured.

Here, a description will be given in details of a configuration for fixing each of ultrasonic wave transmitting and receiving units 5 and 6 to channel 3 and the configuration of each of ultrasonic wave transmitting and receiving units 5 and 6.

Figure 2:
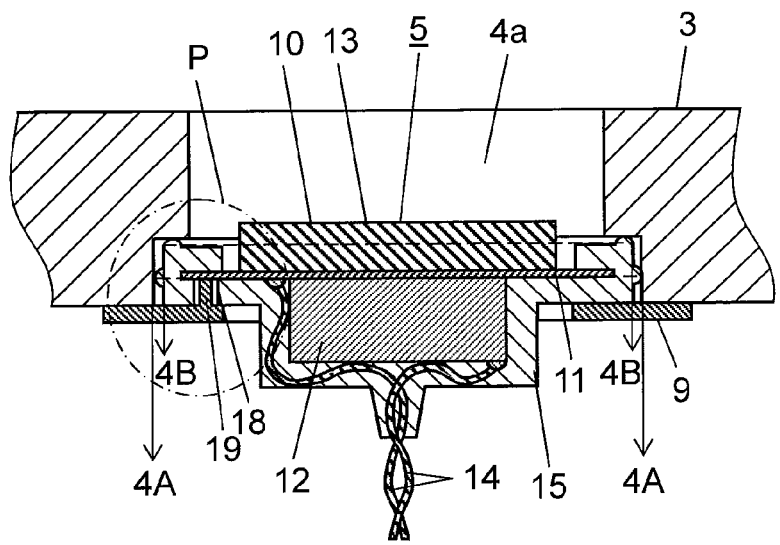
FIG. 2 is a cross-sectional view showing the configuration of an ultrasonic wave transmitting and receiving unit and the configuration of a portion which is fixed to a channel in the first exemplary embodiment according to the present invention.
Figure 3:
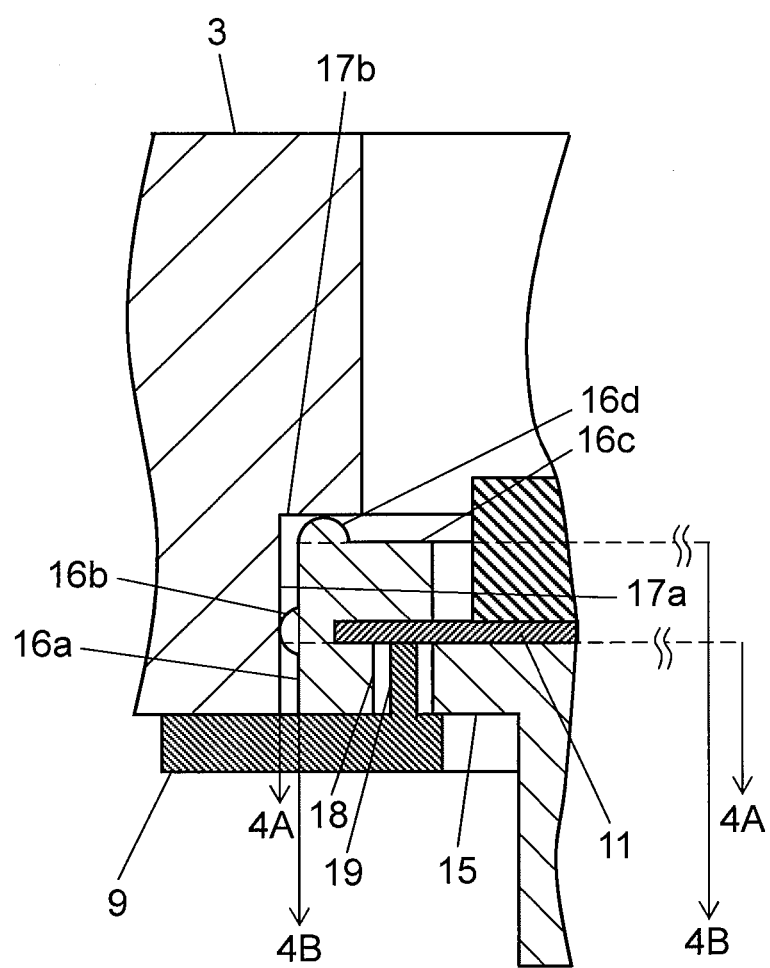
FIG. 3 is a cross-sectional view showing region P shown in FIG. 2 in enlargement.
Figure 4A:
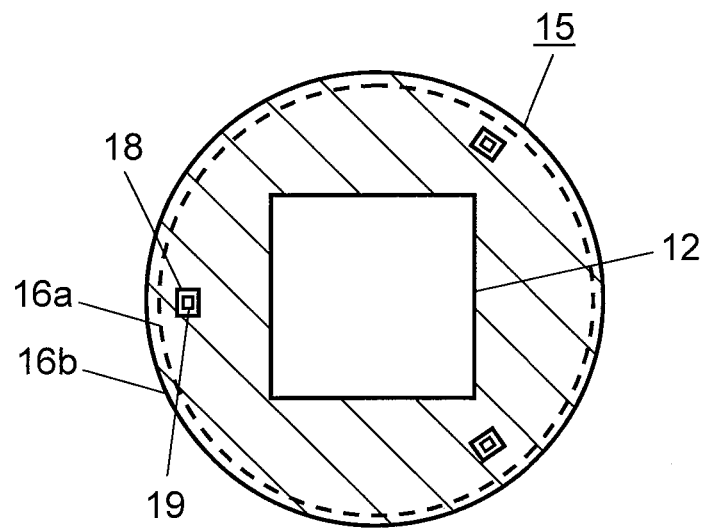
FIG. 4A is a cross-sectional view taken along line 4A-4A of FIG. 2.
Figure 4B:
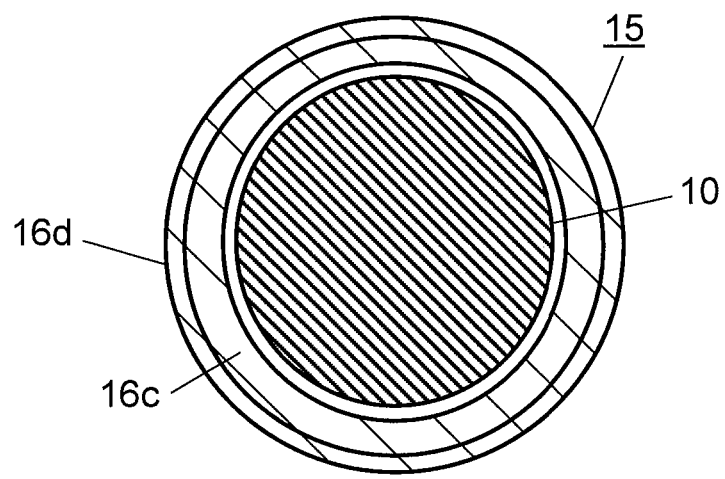
FIG. 4B is a cross-sectional view taken along line 4B-4B of FIG. 2.

FIG. 2 is a cross-sectional view showing the configuration of ultrasonic wave transmitting and receiving unit 5 and the configuration of a portion which is fixed to channel 3 in the first exemplary embodiment according to the present invention. FIG. 3 is a cross-sectional view showing region P shown in FIG. 2 in enlargement. FIG. 4A is a cross-sectional view taken along line 4A-4A of FIG. 2. FIG. 4B is a cross-sectional view taken along line 4B-4B of FIG. 2.

Structures for fixing ultrasonic wave transmitting and receiving units 5 and 6 to channel 3 are the same as each other, and therefore, explanation will be made only on ultrasonic wave transmitting and receiving unit 5 here whereas explanation on ultrasonic wave transmitting and receiving unit 6 will be omitted.

Referring to FIG. 2, ultrasonic wave transmitting and receiving unit 5 is secured by being pressed against channel 3 at opening 4a of channel 3 by fixing member 9.

In ultrasonic wave transmitting and receiving unit 5, acoustic matching member 10 and piezoelectric member supporting plate 11, and piezoelectric member supporting plate 11 and piezoelectric member 12 are respectively bonded to each other on contact planes by means of an adhesive, a conductive paste, or the like.

In the present exemplary embodiment, piezoelectric member supporting plate 11 is formed into a disk-like shape; acoustic matching member 10, into a columnar shape; and piezoelectric member 12, into a rectangular shape. However, the present invention is not limited to those shapes. For example, piezoelectric member 12 may have a slit for preventing spurious vertical vibrations.

Electrodes are formed at both of upper and lower surfaces of piezoelectric member 12. Moreover, the release end of acoustic matching member 10 serves as ultrasonic wave radiation surface 13.

Either one of a pair of lead wires 14 is connected to one of the electrodes in piezoelectric member 12 whereas the other lead wire is connected to piezoelectric member supporting plate 11 joined to the other electrode in piezoelectric member 12. Piezoelectric member supporting plate 11 and the other electrode in piezoelectric member 12 are electrically connected to each other in ohmic contact in the case where an adhesive is used as joining means.

Furthermore, insulating vibration suppressing member 15 is integrally formed in such a manner as to cover piezoelectric member 12 and piezoelectric member supporting plate 11.

Here, explanation will be made in detail on region P shown in FIG. 2 with reference to FIG. 3. Insulating vibration suppressing member 15 has peripheral projection 16b projecting from its peripheral surface 16a. Peripheral projection 16b abuts against abutment surface 17a formed on the inner circumference of channel 3. Moreover, peripheral projection 16b is formed entirely at peripheral surface 16a of insulating vibration suppressing member 15, as shown in FIG. 4A. With this configuration, peripheral projection 16b functions so as to accurately position ultrasonic wave transmitting and receiving unit 5 in a radial direction. In this manner, the formation of peripheral projection 16b around insulating vibration suppressing member 15 enables the center of ultrasonic wave transmitting and receiving unit 5 to be accurately positioned.

Additionally, axial projection 16d is formed at surface 16c of insulating vibration suppressing member 15 with reference to FIG. 3. Axial projection 16d abuts against axial abutment surface 17b of channel 3. As shown in FIG. 4B, axial projection 16d is formed entirely at surface 16c of insulating vibration suppressing member 15. With this configuration, axial projection 16d functions so as to accurately position ultrasonic wave transmitting and receiving unit 5 in the direction of the center axis. In this manner, the formation of axial projection 16d in the axial direction of insulating vibration suppressing member 15 enables ultrasonic wave transmitting and receiving unit 5 to be accurately positioned in the axial direction.

Note that, although peripheral projection 16b and axial projection 16d are respectively formed at the entire surfaces, in the present exemplary embodiment, the present invention is not limited to this example. As long as ultrasonic wave transmitting and receiving units 5 and 6 can be accurately positioned, at least three or more peripheral projections 16b and at least three or more axial projections 16d may be formed at proper positions in the circumferential direction, respectively.

As shown in FIG. 4A, holes 18 are formed at three positions in insulating vibration suppressing member 15. As shown in FIG. 3, hole 18 is configured in such a manner as to penetrate from the outside of insulating vibration suppressing member 15 on the side of piezoelectric member 12 in piezoelectric member supporting plate 11 and then reach piezoelectric member supporting plate 11. The formation of holes 18 in at least three positions for pressing at three or more points enables fixture of the surface. Moreover, the formation of holes 18 on the side of piezoelectric member 12 enables ultrasonic wave transmitting and receiving unit 5 to be pressed from the outside of channel 3. In this manner, the configuration that readily disposes fixing member 9 can be achieved.

Figure 5A:
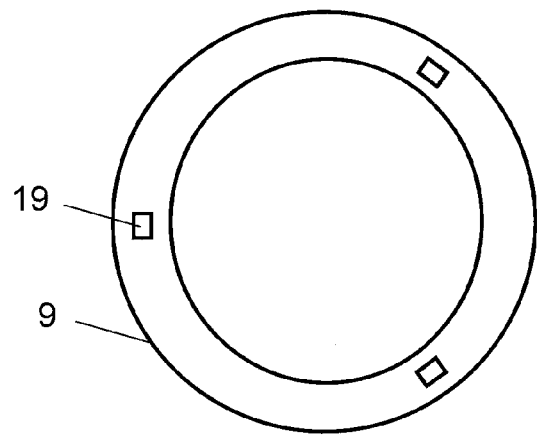
FIG. 5A is a plan view showing a fixing member in the first exemplary embodiment according to the present invention.
Figure 5B:
FIG. 5B is a side view showing the fixing member in the first exemplary embodiment according to the present invention.

FIG. 5A is a plan view showing fixing member 9 in the first exemplary embodiment according to the present invention. Moreover, FIG. 5B is a side view showing fixing member 9.

Fixing member 9 has projections 19 at three positions. As shown in FIG. 3, projections 19 are inserted into holes 18 formed at insulating vibration suppressing member 15, respectively. As a consequence, piezoelectric member supporting plate 11 in ultrasonic wave transmitting and receiving unit 5 can be directly pressed against channel 3. Thus, ultrasonic wave transmitting and receiving unit 5 can be fixed without any inclination of its ultrasonic wave radiation surface.

Acoustic matching member 10 can be achieved by, for example, filling a clearance formed at a glass hollow globe with a thermocurable resin, followed by curing. Alternatively, acoustic matching member 10 may be configured by forming an acoustic film at an acoustic wave radiation surface of a ceramic porous member. In either case, the thickness of acoustic matching member 10 is adjusted to $\lambda/4$ ($\lambda$: the wavelength of an ultrasonic wave), so that an ultrasonic wave can be efficiently propagated to a fluid to be measured.

Piezoelectric member supporting plate 11 may be made of a metallic material such as iron, stainless steel, brass, copper, aluminum, or a nicked-plated steel plate.

Although piezoelectric member 12 may be made of any materials as long as it exhibits piezoelectric characteristics, barium titanate, lead zirconate titanate, or the like is preferred.

Piezoelectric member 12 and lead wire 14, and piezoelectric member supporting plate 11 and lead wire 14 can be respectively joined by means of soldering, conductive paste, or the like.

Explanation will be made on the operation and function of ultrasonic wave transmitting and receiving unit 5 such configured as described above.

Referring to FIG. 2, piezoelectric member 12 is driven in response to a signal having a frequency approximate to the resonance frequency of piezoelectric member 12 by measuring unit 7 (see FIG. 1) via lead wire 14. When an electric signal is applied to piezoelectric member 12, the electric signal is converted into a mechanical vibration in piezoelectric member 12. When resonance occurs between piezoelectric member 12 and acoustic matching member 10, a greater ultrasonic pulse is propagated to a fluid to be measured through opening 4a.

At this time, ultrasonic wave transmitting and receiving unit 5 is accurately fixed in the radial and axial directions with the above-described configuration. Consequently, ultrasonic wave radiation surface 13 of ultrasonic wave transmitting and receiving unit 5 of a predetermined angle can be kept without any change in inclination. Thus, the ultrasonic wave can be propagated without any unrequired reflection, thereby accurately measuring a propagation time.

Moreover, ultrasonic wave transmitting and receiving unit 5 is fixed via projections 19 of fixing member 9 in point contact. Therefore, the reverberation of piezoelectric member 12 can be suppressed to the minimum from being transmitted to channel 3. This effect contributes to reducing a reverberation time in addition to attenuation of reverberant vibrations by insulating vibration suppressing member 15 per se.

Second Exemplary Embodiment

Next, a description will be given of a second exemplary embodiment according to the present invention.

Figure 6:
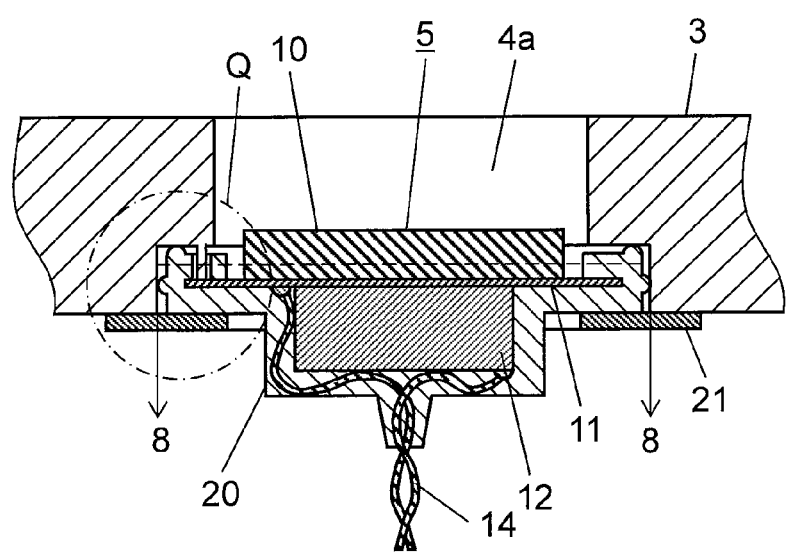
FIG. 6 is a cross-sectional view showing the configuration of an ultrasonic wave transmitting and receiving unit and the configuration of a portion which is fixed to a channel in a second exemplary embodiment according to the present invention.
Figure 7:
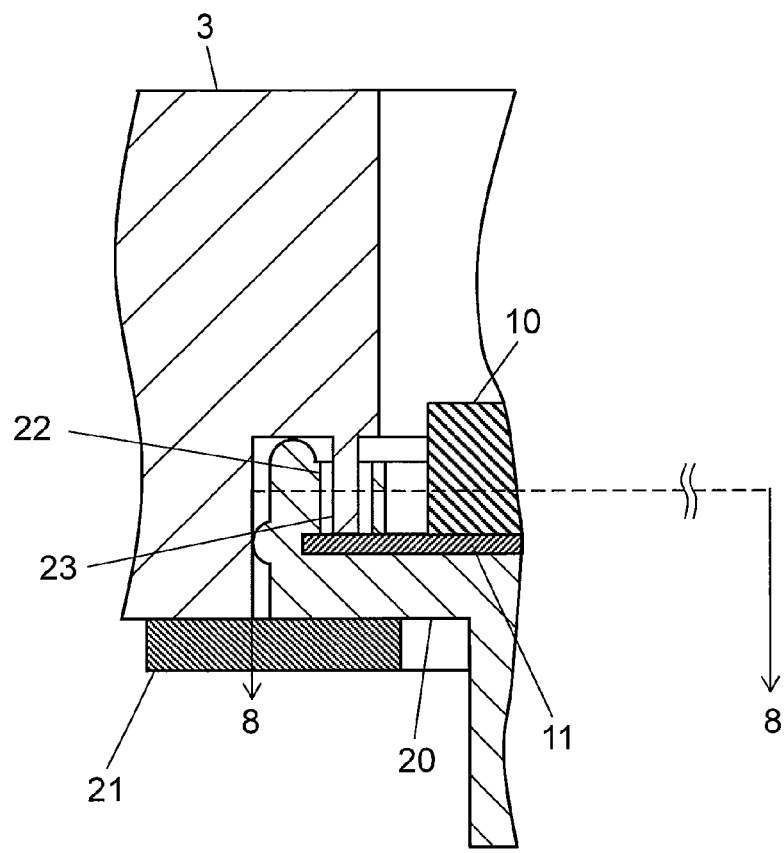
FIG. 7 is a cross-sectional view showing region Q shown in FIG. 6 in enlargement.
Figure 8:
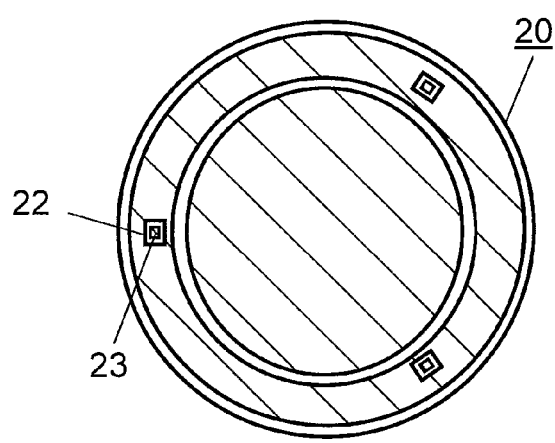
FIG. 8 is a cross-sectional view taken along line 8-8 of FIG. 6.

FIG. 6 is a cross-sectional view showing the configuration of ultrasonic wave transmitting and receiving unit 5 and the configuration of a portion which is fixed to channel 3 in the second exemplary embodiment according to the present invention. Moreover, FIG. 7 is a cross-sectional view showing region Q shown in FIG. 6 in enlargement. FIG. 8 is a cross-sectional view taken along line 8-8 of FIG. 6.

As shown in FIG. 6, the present exemplary embodiment is identical to the first exemplary embodiment in that ultrasonic wave transmitting and receiving unit 5 covered with insulating vibration suppressing member 20 is fixed at opening 4a formed in channel 3 by fixing member 21 in such a manner as to be pressed against channel 3.

Referring to FIG. 7, region Q shown in FIG. 6 will be explained in detail. Insulating vibration suppressing member 20 has holes 22 that are formed to penetrate from the outside of insulating vibration suppressing member 20 on the side of acoustic matching member 10 toward piezoelectric member supporting plate 11. Furthermore, projections 23 are formed at channel 3. In this manner, holes 22 are formed on the side of acoustic matching member 10, thereby accurately positioning piezoelectric member 12.

As shown in FIG. 8, holes 22 are formed at three positions in insulating vibration suppressing member 20. Moreover, projections 23 are formed at three positions corresponding to holes 22.

As shown in FIG. 7, projections 23 are inserted into holes 22 formed at insulating vibration suppressing member 20. As a consequence, piezoelectric member supporting plate 11 in ultrasonic wave transmitting and receiving unit 5 is accurately positioned via projections 23 in the direction in which fixing member 21 is pressed. Thus, ultrasonic wave transmitting and receiving unit 5 can be fixed without any inclination of its ultrasonic wave radiation surface 13.

Figure 9A:
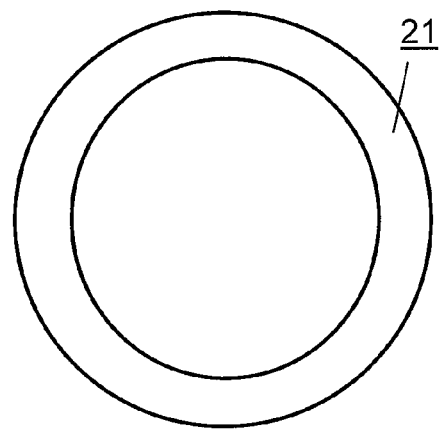
FIG. 9A is a plan view showing a fixing member in the second exemplary embodiment according to the present invention.
Figure 9B:
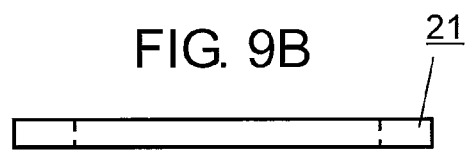
FIG. 9B is a side view showing the fixing member in the second exemplary embodiment according to the present invention.

FIG. 9A is a plan view showing fixing member 21 in the second exemplary embodiment according to the present invention. FIG. 9B is a side view showing fixing member 21. As shown in FIGS. 9A and 9B, fixing member 21 in the present exemplary embodiment is formed into a doughnut-like disk.

A configuration other than the above-described configuration is similar to that in the first exemplary embodiment, and therefore, its explanation will be omitted.

Ultrasonic wave transmitting and receiving unit 5 such configured as described above in the present exemplary embodiment is fixed by using fixing member 21 in such a mariner as to press insulating vibration suppressing member 20. In this manner, piezoelectric member supporting plate 11 is accurately positioned via projections 23 in the direction in which piezoelectric member supporting plate 11 is pressed. Consequently, ultrasonic wave radiation surface 13 of ultrasonic wave transmitting and receiving unit 5 of a predetermined angle can be fixed without any change in inclination. Thus, the ultrasonic wave can be propagated without any unrequired reflection, thereby accurately measuring a propagation time.

Moreover, ultrasonic wave transmitting and receiving unit 5 is fixed via projections 23 in point contact. Therefore, reverberation occurring in piezoelectric member 12 can be suppressed to the minimum from being transmitted to channel 3. This effect contributes to reducing a reverberation time in addition to attenuation of vibrations caused by an ultrasonic pulse by insulating vibration suppressing member 20 per se.

Third Exemplary Embodiment

Next, a description will be given of a third exemplary embodiment according to the present invention.

Figure 10:
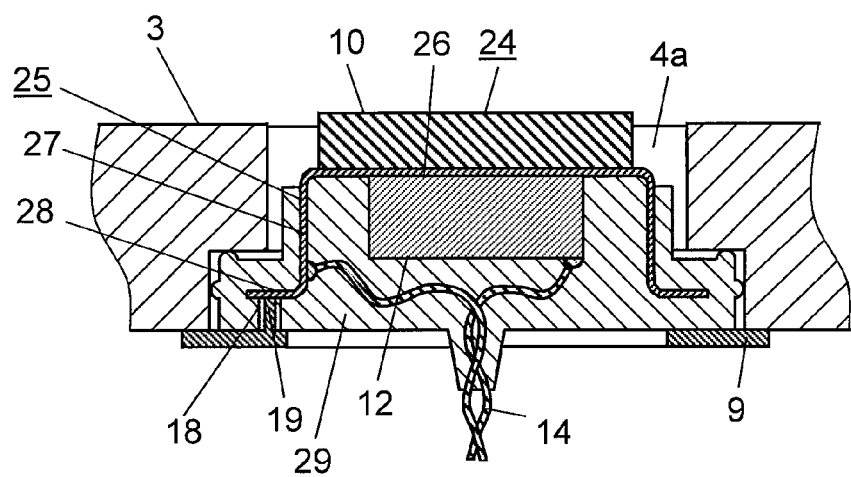
FIG. 10 is a cross-sectional view showing the configuration of an ultrasonic wave transmitting and receiving unit and the configuration of a portion which is fixed to a channel in a third exemplary embodiment according to the present invention.
Figure 11:
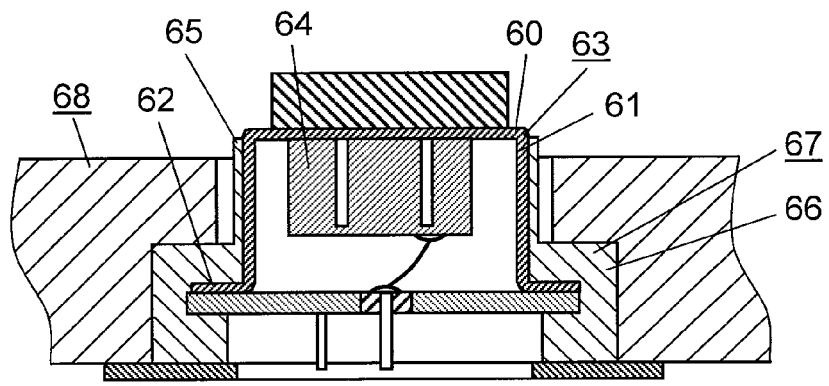
FIG. 11 is a cross-sectional view showing the configuration of a conventional ultrasonic wave transmitting and receiving unit.
Figure 12:
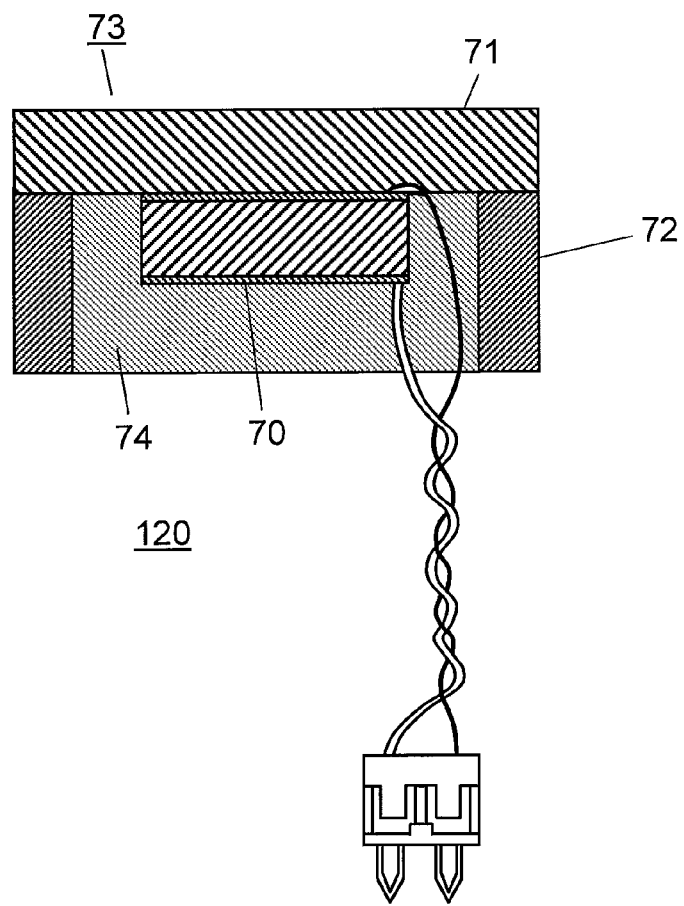
FIG. 12 is a cross-sectional view showing a conventional ultrasonic wave transmitting and receiving unit having another configuration.

FIG. 10 is a cross-sectional view showing the configuration of ultrasonic wave transmitting and receiving unit 24 and the configuration of a portion which is fixed to channel 3 in a third exemplary embodiment according to the present invention.

Referring to FIG. 10, ultrasonic wave transmitting and receiving unit 24 is fixed at opening 4a formed in channel 3 by fixing member 9 in such a manner as to be pressed against channel 3.

In ultrasonic wave transmitting and receiving unit 24 in the present exemplary embodiment, piezoelectric member supporting plate 11 in ultrasonic wave transmitting and receiving unit 5 described in the first exemplary embodiment is replaced with topped cylindrical metal case 25.

Topped cylindrical metal case 25 is provided with top 26, side wall 27, and supporter 28 extending outward from side wall 27. Piezoelectric member 12 is joined to the inside of top 26. Acoustic matching member 10 is joined to the outside of top 26.

One of lead wires 14 is connected to one of electrodes of piezoelectric member 12 whereas the other lead wire is connected to topped cylindrical metal case 25 joined to the other electrode of piezoelectric member 12. Topped cylindrical metal case 25 and the other electrode of piezoelectric member 12 are electrically connected in ohmic contact in the case where an adhesive is used as joining means.

Insulating vibration suppressing member 29 is integrally formed in such a manner as to cover the inside of topped cylindrical metal case 25 including the periphery of piezoelectric member 12 and the outside of topped cylindrical metal case 25, with a predetermined adhesiveness.

In the present exemplary embodiment, projections 19 formed at fixing member 9 are adapted to directly press supporter 28 of topped cylindrical metal case 25.

The above-described configuration is similar to that in the first exemplary embodiment, and therefore, its explanation will be omitted.

As described above, supporter 28 of topped cylindrical metal case 25 is designed to fix ultrasonic wave transmitting and receiving unit 24 in the present exemplary embodiment. Thus, ultrasonic wave transmitting and receiving unit 24 is fixed at a position remoter from piezoelectric member 12, thereby suppressing transmission of reverberation.

Note that, although piezoelectric member supporting plate 11 is replaced with topped cylindrical metal case 25 in ultrasonic wave transmitting and receiving unit 24 in the present exemplary embodiment in comparison with ultrasonic wave transmitting and receiving unit 5 described in the first exemplary embodiment, the present exemplary embodiment is not limited to this. For example, piezoelectric member supporting plate 11 may be replaced with topped cylindrical metal case 25 in ultrasonic wave transmitting and receiving unit 24 in comparison with ultrasonic wave transmitting and receiving unit 5 described in the second exemplary embodiment.

As described above, an ultrasonic flow rate measuring apparatus is constituted by using the ultrasonic wave transmitting and receiving units described in the first to third exemplary embodiments. That is to say, the ultrasonic flow rate measuring apparatus includes: a flow rate measuring unit for measuring the flow rate of a fluid flowing on a channel; a pair of ultrasonic wave transmitting and receiving units disposed in the flow rate measuring unit; a projection for holding the ultrasonic wave transmitting and receiving unit at the hole; a measuring unit for measuring an ultrasonic wave propagation time between the ultrasonic wave transmitting and receiving units; and a calculating unit for obtaining the flow rate in response to a signal output from the measuring unit. As a consequence, the position and inclination of the ultrasonic wave radiation surface of the ultrasonic wave transmitting and receiving unit can be accurately set, thereby accurately measuring the flow rate.

Note that a pair of ultrasonic wave transmitting and receiving units may be constituted by combining the ultrasonic wave transmitting and receiving units described in the first, second, and third exemplary embodiments with each other.

INDUSTRIAL APPLICABILITY

As described above, the ultrasonic wave transmitting and receiving unit and the ultrasonic flow rate measuring apparatus according to the present invention can produce remarkable effects that the ultrasonic wave radiation surface of the ultrasonic wave transmitting and receiving unit can be accurately set, thus achieving the ultrasonic flow rate measuring apparatus capable of measuring the flow rate with high accuracy. Hence, the ultrasonic flow rate measuring apparatus can accurately measure the propagation time, and thus, is applicable to and useful for a gas meter, an industrial flow rate meter, and the like in which the flow rate needs be accurately measured.

The invention claimed is:

1. An ultrasonic wave transmitting and receiving unit comprising:
   a piezoelectric member supporting plate;
   an acoustic matching member fixed to one surface of the piezoelectric member supporting plate;
   a piezoelectric member fixed to another surface; and
   an insulating vibration suppressing member integrally formed in such a manner as to cover the piezoelectric member and the piezoelectric member supporting plate, the insulating vibration suppressing member having a hole reaching the piezoelectric member supporting plate.

2. An ultrasonic wave transmitting and receiving unit comprising:
   a topped cylindrical metal case having a top, a side wall, and a supporter extending outward from the side wall;
   a piezoelectric member contained at an inner surface of the top of the topped cylindrical metal case;
   an acoustic matching member disposed at an outer surface of the top; and
   an insulating vibration suppressing member integrally formed in such a manner as to cover the piezoelectric member and the topped cylindrical metal case, the insulating vibration suppressing member having a hole reaching the supporter.

3. The ultrasonic wave transmitting and receiving unit according to claim 1, wherein the hole is formed in at least three positions.

4. The ultrasonic wave transmitting and receiving unit according to claim 1, wherein the hole is formed on a side of the piezoelectric member.

5. The ultrasonic wave transmitting and receiving unit according to claim 1, wherein the hole is formed on a side of the acoustic matching member.

6. The ultrasonic wave transmitting and receiving unit according to claim 1, wherein a peripheral projection is formed on a periphery of the insulating vibration suppressing member.

7. The ultrasonic wave transmitting and receiving unit according to claim 1, wherein an axial projection is formed in an axial direction of the insulating vibration suppressing member.

8. An ultrasonic wave flow rate measuring apparatus comprising:
   a flow rate measuring unit for measuring a flow rate of a fluid flowing on a channel;
   a pair of the ultrasonic wave transmitting and receiving units according to claim 1 disposed in the flow rate measuring unit;
   a projection for holding the ultrasonic wave transmitting and receiving unit at the hole;
   a measuring unit for measuring an ultrasonic wave propagation time between the pair of ultrasonic wave transmitting and receiving units; and
   a calculating unit for obtaining the flow rate of the fluid in response to a signal output from the measuring unit.

9. The ultrasonic wave transmitting and receiving unit according to claim 2, wherein the hole is formed in at least three positions.

10. The ultrasonic wave transmitting and receiving unit according to claim 2, wherein the hole is formed on a side of the piezoelectric member.

11. The ultrasonic wave transmitting and receiving unit according to claim 2, wherein the hole is formed on a side of the acoustic matching member.

12. The ultrasonic wave transmitting and receiving unit according to claim 2, wherein a peripheral projection is formed on a periphery of the insulating vibration suppressing member.

13. The ultrasonic wave transmitting and receiving unit according to claim 2, wherein an axial projection is formed in an axial direction of the insulating vibration suppressing member.

14. An ultrasonic wave flow rate measuring apparatus comprising:
   a flow rate measuring unit for measuring a flow rate of a fluid flowing on a channel;
   a pair of the ultrasonic wave transmitting and receiving units according to claim 2 disposed in the flow rate measuring unit;
   a projection for holding the ultrasonic wave transmitting and receiving unit at the hole;
   a measuring unit for measuring an ultrasonic wave propagation time between the pair of ultrasonic wave transmitting and receiving units; and
   a calculating unit for obtaining the flow rate of the fluid in response to a signal output from the measuring unit.

15. An ultrasonic wave flow rate measuring apparatus comprising:
   a flow rate measuring unit for measuring a flow rate of a fluid flowing on a channel;
   a pair of the ultrasonic wave transmitting and receiving units according to claim 3 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

16. An ultrasonic wave flow rate measuring apparatus comprising:

a flow rate measuring unit for measuring a flow rate of a fluid flowing on a channel;

a pair of the ultrasonic wave transmitting and receiving units according to claim 4 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

17. An ultrasonic wave flow rate measuring apparatus comprising:

a flow rate measuring unit for measuring a flow rate of a fluid flowing on a channel;

a pair of the ultrasonic wave transmitting and receiving units according to claim 5 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

18. An ultrasonic wave flow rate measuring apparatus comprising:

a flow rate measuring unit for measuring a flow rate of a fluid flowing on a channel;

a pair of the ultrasonic wave transmitting and receiving units according to claim 6 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

19. An ultrasonic wave flow rate measuring apparatus comprising:

a flow rate measuring unit for measuring a flow rate of a fluid flowing on a channel;

a pair of the ultrasonic wave transmitting and receiving units according to claim 7 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

20. An ultrasonic wave flow rate measuring apparatus comprising:

a flow rate measuring unit for measuring a flow rate of a fluid flowing on a channel;

a pair of the ultrasonic wave transmitting and receiving units according to claim 9 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

21. An ultrasonic wave flow rate measuring apparatus comprising:

a flow rate measuring unit for measuring a flow rate of a fluid flowing on a channel;

a pair of the ultrasonic wave transmitting and receiving units according to claim 10 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

22. An ultrasonic wave flow rate measuring apparatus comprising:

a flow rate measuring unit for measuring a flow rate of a fluid flowing on a channel;

a pair of the ultrasonic wave transmitting and receiving units according to claim 11 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

23. An ultrasonic wave flow rate measuring apparatus comprising:

a flow rate measuring unit for measuring a flow rate of a fluid flowing on a channel;

a pair of the ultrasonic wave transmitting and receiving units according to claim 12 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

24. An ultrasonic wave flow rate measuring apparatus comprising:

a flow rate measuring unit for measuring a flow rate of a fluid flowing on a channel;

a pair of the ultrasonic wave transmitting and receiving units according to claim 13 disposed in the flow rate measuring unit;

a projection for holding the ultrasonic wave transmitting and receiving unit at the hole;

a measuring unit for measuring an ultrasonic wave propagation time between the pair of ultrasonic wave transmitting and receiving units; and a calculating unit for obtaining the flow rate of the fluid in response to a signal output from the measuring unit.

* * * * *